(12) United States Patent
Kim et al.

(10) Patent No.: US 12,084,910 B2
(45) Date of Patent: Sep. 10, 2024

(54) APPARATUS FOR MANUFACTURING VACUUM GLAZING

(71) Applicant: LG ELECTRONICS INC., Seoul (KR)

(72) Inventors: Sora Kim, Seoul (KR); Soyoon Kim, Seoul (KR); Youngseok Kim, Seoul (KR); Eunsoo Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 829 days.

(21) Appl. No.: 16/968,502

(22) PCT Filed: Jan. 31, 2019

(86) PCT No.: PCT/KR2019/001399
§ 371 (c)(1),
(2) Date: Aug. 7, 2020

(87) PCT Pub. No.: WO2019/160263
PCT Pub. Date: Aug. 22, 2019

(65) Prior Publication Data
US 2021/0395129 A1 Dec. 23, 2021

(30) Foreign Application Priority Data
Feb. 19, 2018 (KR) .................. 10-2018-0019201

(51) Int. Cl.
*C03B 19/01* (2006.01)
*E06B 3/677* (2006.01)

(52) U.S. Cl.
CPC .................. *E06B 3/6775* (2013.01)

(58) Field of Classification Search
CPC .................................................. E06B 3/6775
See application file for complete search history.

(56) References Cited

U.S. PATENT DOCUMENTS 2,805,452 A * 9/1957 Englehart .......... C03B 23/245
52/204.52
6,506,272 B1 1/2003 Aggas
(Continued)

FOREIGN PATENT DOCUMENTS

CN 105948469 A 9/2016
JP 2011-003397 A 1/2011
(Continued)

*Primary Examiner* — Philip C Tucker
*Assistant Examiner* — John Blades
(74) *Attorney, Agent, or Firm* — Bryan Cave Leighton Paisner LLP

(57) ABSTRACT

The present invention relates to an apparatus for manufacturing vacuum glass. An apparatus for manufacturing vacuum glass, according to an embodiment of the present invention, includes an exhaust finishing frit inserted into an exhaust hole of a plate glass assembly so as to seal the exhaust hole in an exhaust process. In addition, the exhaust finishing frit comprises: a frit body having a body top part on which a cap frit is placed; a depressed portion which is upwardly depressed from the bottom of the frit body; and an exhaust guide part which is formed to penetrate the outer circumferential surface of the frit body. Thus, it is possible to prevent bubbles from being generated in the exhaust finishing frit during a finishing process.

16 Claims, 12 Drawing Sheets

(56) References Cited

U.S. PATENT DOCUMENTS

| | | | |
|---|---|---|---|
| 2004/0253395 A1 | 12/2004 | Amari et al. | |
| 2012/0148795 A1 | 6/2012 | Kwon et al. | |
| 2014/0252386 A1 | 9/2014 | Ito et al. | |
| 2017/0129798 A1 | 5/2017 | Steinwandel et al. | |
| 2019/0203523 A1* | 7/2019 | Park | C03C 27/06 |

FOREIGN PATENT DOCUMENTS

| | | | | |
|---|---|---|---|---|
| JP | 2014-197535 A | 10/2014 | | |
| KR | 10-2011-0077893 A | 7/2011 | | |
| KR | 10-2011-0080425 A | 7/2011 | | |
| KR | 10-2014-0092129 A | 7/2014 | | |
| KR | 10-1442030 B1 | 9/2014 | | |
| KR | 10-2014-0120139 A | 10/2014 | | |
| KR | 10-2014-0120140 A | 10/2014 | | |
| KR | 2014-0120140 | * 10/2014 | ............ | Y02B 80/24 |
| KR | 10-2015-0001050 A | 1/2015 | | |
| KR | 10-2015-0124068 A | 11/2015 | | |
| KR | 10-2017-0127771 A | 11/2017 | | |
| KR | 10-2018-0005462 A | 1/2018 | | |
| KR | 10-2018-0011970 A | 2/2018 | | |
| WO | 0175260 A1 | 10/2001 | | |
| WO | WO 2019/001670 | * 1/2019 | ............ | E06B 3/677 |

* cited by examiner

APPARATUS FOR MANUFACTURING VACUUM GLAZING

CROSS-REFERENCE TO RELATED APPLICATIONS

This application is a National Stage Application of International Application No. PCT/KR2019/001399, filed on Jan. 31, 2019, which claims the benefit of Korean Patent Application No. 10-2018-0019201, filed on Feb. 19, 2018, all of which are hereby incorporated by reference in their entirety for all purposes as if fully set forth herein.

TECHNICAL FIELD

The present disclosure relates to an apparatus for manufacturing vacuum glazing.

BACKGROUND ART

Glass may be used for the door of a home appliance. For example, the glass may be used for the door of a refrigerator. If the glass is applied to the door of the refrigerator, a user has an advantage in that the user may easily see foods stored in the refrigerator through transparent glass without opening the door.

However, since the glass represents a lower insulating rate due to the intrinsic characteristic of the glass, chilly air stored in the refrigerator may leak to the outside through the glass. In particular, when the glass constitutes a glazing in a single layer, the lower insulating rate may be a more serious problem.

To compensate for the lower insulating rate, the glass may constitute a double glazing or a vacuum glazing including at least two glazings. The double glazing may be formed by injecting specific gas, which has a lower heat transfer coefficient, between the two glazings.

In addition, the vacuum glazing may be formed by making, in the vacuum state, the space between the two glazings. The vacuum glazing is more advantageous than the double glazing in terms of an ability to block heat from being transferred to an inside or an outside of glass.

The vacuum glazing may be manufactured through an apparatus for manufacturing the vacuum glazing. For example, the apparatus for manufacturing the vacuum glazing may include a heating device to melt a sealing member to bond two glass plates to each other, a vacuum device to make vacuum between two glass plates, and a capping device to seal an exhaust hole formed in the two glass plates.

Regarding such an apparatus for manufacturing the vacuum glazing, there is introduced the following related art.

1. Korean Unexamined Patent Application No. (published date): 10-2015-0124068 (Nov. 5, 2015).
2. The title of the invention: Apparatus for manufacturing vacuum glazing panel.

The related art has following problems.

First: a vacuum chamber is provided to form a vacuum atmosphere, and vacuum glazing panel has to be introduced into the vacuum panel to perform a manufacturing process. Accordingly, the size of the vacuum chamber is excessively increased. Accordingly, as the volume of the manufacturing apparatus is increased, it is difficult to realize a compact manufacturing apparatus.

In addition, when the vacuum chamber, which is an essential component of the conventional manufacturing apparatus, is not applied, a vacuum leak may occur in the capping device for the vacuum glazing panel. Accordingly, it is not easy to realize the conventional manufacturing apparatus by removing the vacuum chamber.

Second, as there is present the difference between a temperature in an exhaust process of the vacuum glazing panel and a temperature in a finish process to seal the exhaust hole. Accordingly, when the exhaust process and the finish process are sequentially performed, the glass panel may be damaged due to the thermal impact resulting from the temperature difference.

Third, when the exhaust process is performed, stress may be intensively applied to a peripheral portion of the exhaust hole, thereby causing the damage to the glass panel.

DISCLOSURE

Technical Problem

The present disclosure is suggested to solve such a problem, and is to provide an apparatus for manufacturing vacuum glazing capable of improving insulation performance.

In addition, the present disclosure is to provide an apparatus for manufacturing vacuum glazing in a compact structure. In particular, the present disclosure is to provide an apparatus for manufacturing vacuum glazing, capable of performing an exhaust process and a finish process under a vacuum atmosphere, as an exhaust head, which includes a heating device and a vacuum device, is provided.

In addition, the present disclosure is to provide an apparatus for manufacturing vacuum glazing, capable of preventing air bubbles from being generated in an exhaust finishing frit in a finish process by effectively transferring exhaust pressure to the exhaust finishing frit through a cap frit.

Further, the present disclosure is to provide an apparatus for manufacturing vacuum glazing, capable of preventing a thermal impact from being applied to a plate glass assembly due to the difference in temperature between an exhaust process and a finish process by preventing thermal transfer between a heating device and the plate glass assembly, as a support plate is provided on a cap frit.

In addition, the present disclosure is to provide an apparatus for manufacturing vacuum glazing, which includes a configuration allowing a support plate to easily press a cap frit.

In addition, the present disclosure is to provide an apparatus for manufacturing vacuum glazing, capable of easily exhausting internal gas from a plate glass assembly by improving the structure of an exhaust finishing frit.

Technical Solution

According to an embodiment of the present disclosure, an apparatus for manufacturing vacuum glazing may include an exhaust finishing frit inserted into an exhaust hole of a plate glass assembly to seal the exhaust hole in an exhaust process.

The exhaust finishing frit includes a frit body having a body top surface on which a cap frit is placed, and a recess part recessed upward from a bottom surface of the frit body.

In addition, the exhaust finishing frit further may include an exhaust guide part formed through an outer circumferential surface of the frit body, thereby preventing air bubbles from being generated from the exhaust finishing frit in a finish process.

Since the recess part communicates with the exhaust guide part, the internal gas of the plate glass assembly may be easily discharged in the exhaust process.

The exhaust guide part is formed in a radial direction of the frit body. When the exhaust pump is driven, the internal gas of the plate glass assembly may be discharged to the exhaust pump through the recess part and the exhaust guide part.

The exhaust guide part may have a circular shape or a polygonal shape.

Since the diameter of the exhaust guide part may be at least 1 mm, the exhaust process may be smoothly performed.

A plurality of exhaust guide part may be provided.

Since a distance between two exhaust guide parts, which are closest to each other, of the plurality of exhaust guide parts is at least 1 mm, the shape of the exhaust finishing frit may be maintained.

Since lengths of a quadrangular-shaped exhaust guide part in a vertical direction and in a horizontal direction are at least 1 mm, the exhaust process may be easily performed, and the shape of the exhaust finishing frit may be easily maintained.

The exhaust hole may be formed through a second plate glass from a top surface of the second plate glass to a bottom surface of the second plate glass, thereby easily discharging the internal gas of the plate glass assembly.

The exhaust hole may have a stepped shape, and the exhaust finishing frit may be supported to the stepped exhaust hole.

The exhaust head includes an inner space having a flowing space for exhaust gas, and a heater disposed in the inner space to provide a heat source for heating the exhaust finishing frit.

The apparatus further includes a vacuum pad interposed between the plate glass assembly and the exhaust head to prevent exhaust gas from leaking out of the exhaust head.

The vacuum pad may include a graphite sheet or a metallic member.

Advantageous Effects

According to the present disclosure, the vacuum glazing may be manufactured with the improved insulation performance through the technical solution.

In addition, since the apparatus for manufacturing the vacuum glazing, which has the compact structure without the vacuum chamber for introducing the plate glass assembly, is realized, the manufacturing process of the vacuum glazing may be simple, and the manufacturing cost of the vacuum glazing may be reduced. In particular, the exhaust process and the finish process may be easily performed under the vacuum atmosphere by providing the exhaust head including the heating device and the vacuum device.

In addition, when the exhaust process is performed by providing the cap frit in the exhaust finishing frit, the exhaust pressure may be effectively applied to the exhaust finishing frit through the cap frit.

Particularly, since the exhaust finishing frit having a cylindrical shape includes the exhaust guide part formed in the outer circumferential surface thereof, the exhaust pressure is uniformly transferred to the exhaust finishing frit, thereby preventing air bubbles from being generated in the exhaust finishing frit in the finish process. In addition, the internal gas may be easily exhausted from a plate glass assembly through the exhaust guide part.

In addition, the support plate is provided on the cap frit to prevent heat from being transferred to the space between the heating device and the plate glass assembly. Accordingly, the thermal impact may be prevented from being applied to the plate glass assembly due to the temperature difference in the exhaust process and the finish process.

In addition, the elastic member is supported on the support plate such that the support plate easily presses the cap frit. Accordingly, the stress applied to the peripheral portion of the exhaust hole may be distributed to the cap frit or the support plate, thereby preventing the damage to the plate glass assembly.

MODE FOR INVENTION

Hereinafter, the detailed embodiment of the present disclosure will be described with reference to accompanying drawings. However, the spirit of the present disclosure is not limited to suggested embodiments, and those skilled in the art, which understands the spirit of the present disclosure, may easily suggest another embodiment within the same technical scope.

First Embodiment

Figure 1:
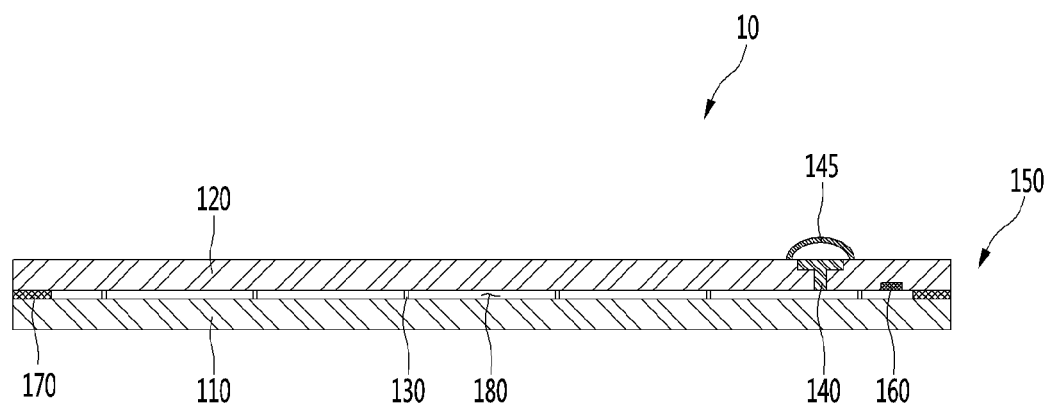
FIG. 1 is a sectional view illustrating the configuration of vacuum glazing according to an embodiment of the present disclosure.

FIG. 1 is a sectional view illustrating the configuration of vacuum glazing according to an embodiment of the present disclosure.

Referring to FIG. 1, according to an embodiment of the present disclosure, vacuum glazing 10 may be used for a door of a refrigerator.

The vacuum glazing 10 includes a plurality of plate glasses 110 and 120. The plurality of plate glasses 110 and 120 include the first plate glass 110 and the second plate glass 120 disposed at one side of the first plate glass 110. Although the direction, in which the first and second plate glasses 110 and 120 are arranged, may be varied depending on viewing directions, the second plate glass 120 may be disposed on the first plate glass 110 when viewed based on the drawings.

For example, when the vacuum glazing 10 is used for the door of the refrigerator, the second plate glass 120 may form the rear surface of the door of the refrigerator and the first plate glass 110 may form the front surface of the door of the refrigerator.

The first plate glass 110 and the second plate glass 120 may be provided in the form of a thin plate. For example, the thicknesses of the first and second plate glasses 110 and 120 may be formed in the range of 3.5 mm to 4.5 mm. For example, the first and second plate glasses 110 and 120 may have, for example, the shape of a rectangular panel. In addition, the first and second plate glasses 110 and 120 may be provided in equal size or in the same shape.

The first and second plate glasses 110 and 120 may be configured to be combined with each other. A sealant 170 may be interposed between the first and second plate glasses 110 and 120. In detail, the sealant 170 may be provided at the edge portions of the first and second plate glasses 110 and 120 to seal the space between the first and second plate glasses 110 and 120.

The sealant 170 may be applied to the first plate glass 110. For example, the sealant 170 may be sprayed on the first plate glass 110. In addition, the sealant 170 may include a glass frit. When a plate glass assembly (110 and 120 is formed and heated as the first and second plate glasses 110 and 120 are assembled with each other and then heated, the sealant 170 is melted to be compressed between the first and second plate glasses 110 and 120.

The first and second plate glasses 110 and 120 may be disposed to be spaced apart from each other in a vertical direction, and a vacuum layer 180 may be formed in the space between the first and second plate glasses 110 and 120. In other words, the vacuum layer 180 may be formed between the top surface of the first plate glass 110 and the bottom surface of the second plate glass 120. The vertical width of the vacuum layer 180 may be formed to be in the range of about 0.18 mm to 0.22 mm, and the vacuum pressure may be 10-3 Torr or less.

A spacer 130 may be provided between the first and second plate glasses 110 and 120 to support the first and second plate glasses 110 and 120. The spacer 130 may be provided in the vacuum layer 180 and may have, for example, a substantially cylindrical shape.

A lower portion of the spacer 130 may be supported on the top surface of the first plate glass 110, and an upper portion of the spacer 130 may support the bottom surface of the second plate glass 120.

The spacer 130 includes a plurality of spacers 130. The diameter of the spacer 130 may be about 0.5 mm, and the spacing between the plurality of spacers 130 may be about 25 mm.

An exhaust finishing material 140 is provided on the second plate glass 120. The exhaust finishing material 140, which is a component to seal an exhaust hole 125 (see FIG. 2C) formed in the second plate glass 120, may be formed as an exhaust finishing frit 140a (see FIG. 3) is melted and cooled.

The exhaust hole 125 is a component to exhaust gas present between the first and second plate glasses 110 and 120 to form the vacuum layer 180 in the space between the first and second plate glasses 110 and 120. The exhaust hole 125 may be formed through the second plate glass 120 in the vertical direction. In other words, the exhaust hole 125 may be formed through the second plate glass 120 while extending from the top surface to the bottom surface of the second plate glass 120.

After the gas is exhausted through the exhaust hole 125, the exhaust finishing material 140 closes the exhaust hole 125. For example, the exhaust finishing material 140 may be formed of a glass frit including a glass material having a lower melting point.

The vacuum glazing 10 further includes an exhaust cap 145 provided on the exhaust finishing material 140. The exhaust cap 145, which has a cap shape to cover the exhaust finishing material 140, may include a metallic material. The exhaust cap 145 may prevent external pressure of the vacuum glazing 10 from being applied to the exhaust finishing material 140, thereby preventing the exhaust finishing material 140 from the exhaust hole 125 or preventing the exhaust finishing material 140 from being broken.

The vacuum glazing 10 further includes a gas adsorbent 160 (getter). The gas adsorbent 160 may be understood as a configuration to absorb the moisture or gas that is able to be generated in the manufacturing process of the vacuum glazing 10.

In other words, even if the vacuum layer 180 is formed inside the vacuum glazing 10, moisture or specified gas may be generated in the first and second plate glasses 110 and 120 or the spacer 130. The gas adsorbent 160 absorbs the gas such that the vacuum state is maintained. For example, the gas adsorbent 160 may include non-evaporable getter activated when a current is applied. After the vacuum glazing 10 is completely manufactured, power supplied from the outside of the vacuum glazing 10 may be supplied to the gas adsorbent 160 through a wire.

Figure 2A:
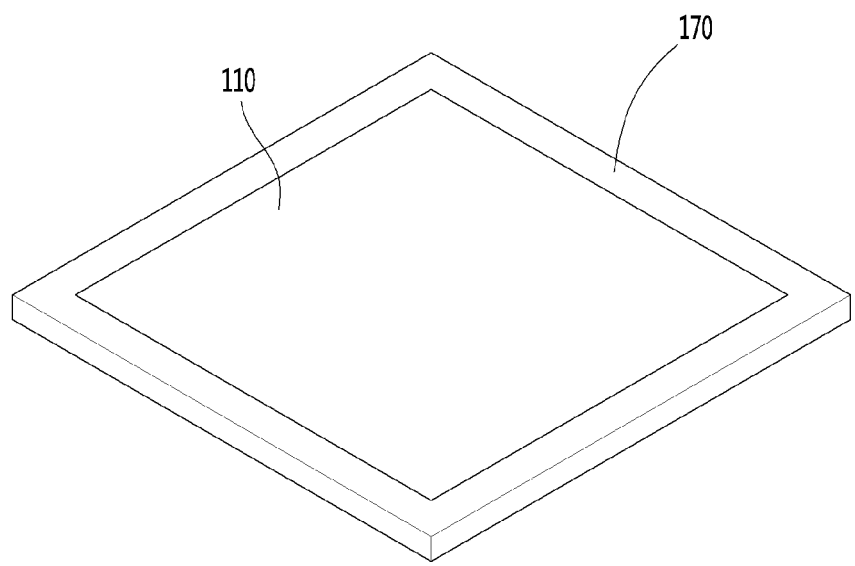
FIGS. 2A to 2C are views illustrating a manufacturing process of a plate glass assembly according to an embodiment of the present disclosure.
Figure 2B:
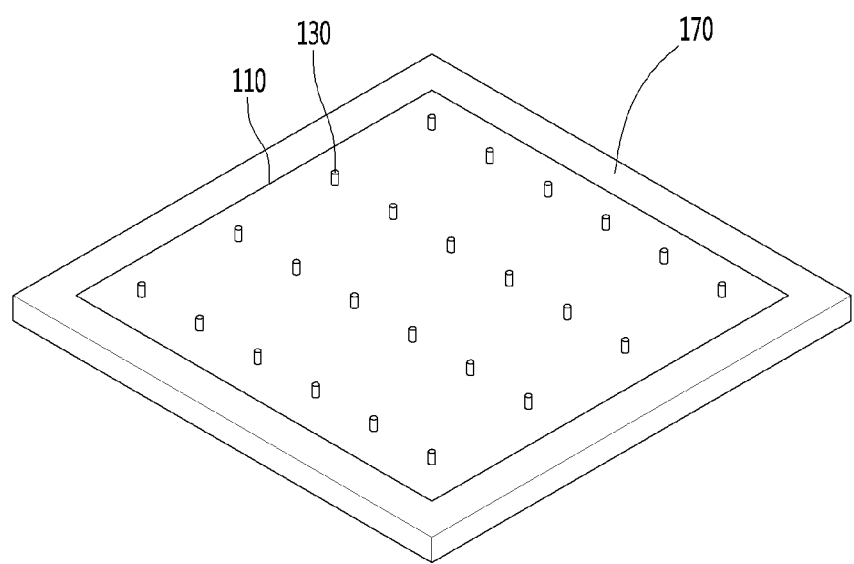
Figure 2C:
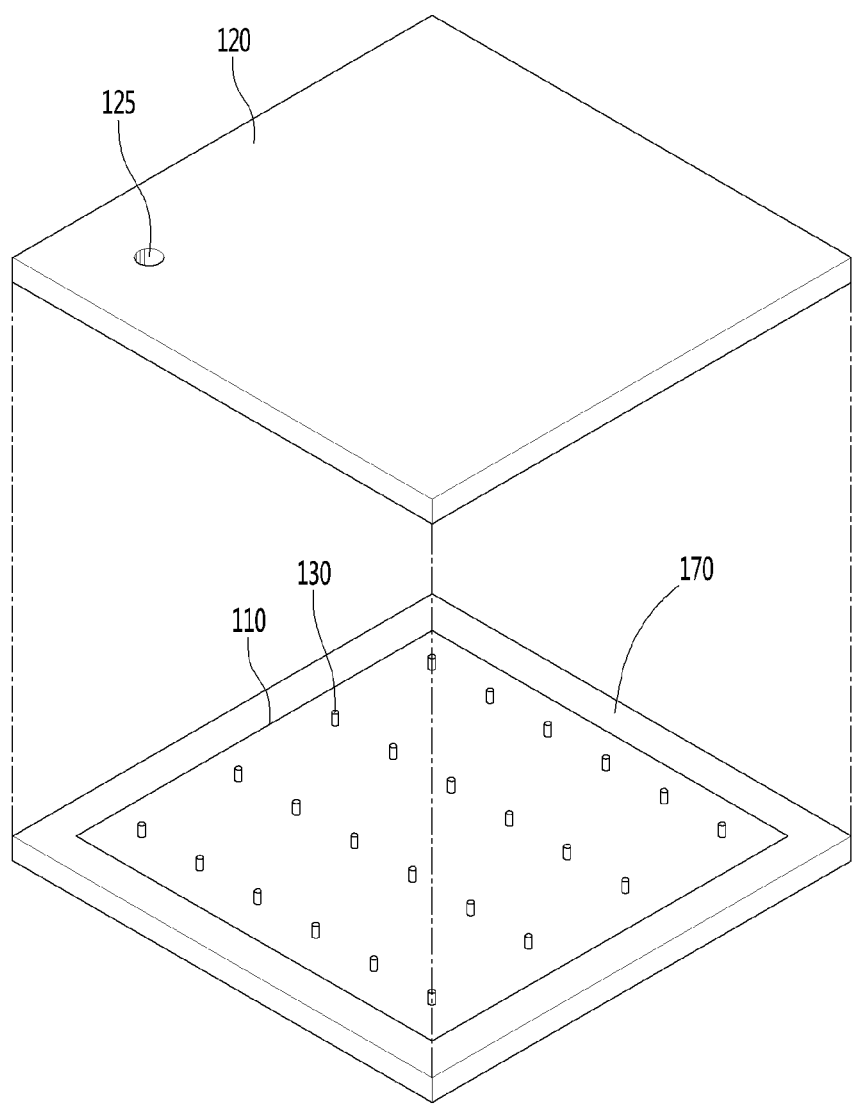

FIGS. 2A to 2C are views illustrating a manufacturing process of a plate glass assembly according to an embodiment of the present disclosure.

First, referring to FIG. 2A, the first plate glass 110 is provided. The first plate glass 110 may be provided while being cleaned.

The sealant 170 is applied to the first plate glass 110. The sealant 170 may be applied along an edge of the first plate glass 110. For example, the sealant 170 may be applied in a rectangular shape onto one surface of the first plate glass 110.

The spacer 130 may be provided on the top surface of the first plate glass 110. A plurality of spacers 130 may be provided at preset distances. For example, the plurality of spacers 130 may be arranged in a lattice (matrix) form. The plurality of spacers 130 may protrude from the top surface of the first plate glass 110 (see FIG. 2B).

The second plate glass 120 may be covered on the first plate glass 110. When the second plate glass 120 is provided, the upper portions of the plurality of spacers 130 may support the bottom surface of the second plate glass 120.

The exhaust hole 125 may be formed in the second plate glass 120. As described above, the exhaust hole 125 is understood as a component to exhaust gas present between the first and second plate glasses 110 and 120 to form the vacuum layer 180. In addition, the gas adsorbent 160 may be provided on the bottom surface of the second plate glass 120.

When the first and second plate glasses 110 and 120 are assembled in the above method, the assembly (hereinafter, a plate glass assembly) of the first and second plate glasses 110 and 120 is heated. In this procedure, the sealant 170 is melted and compressed to seal the edge portions of the first and second plate glasses 110 and 120 (see FIG. 2C).

Figure 3:
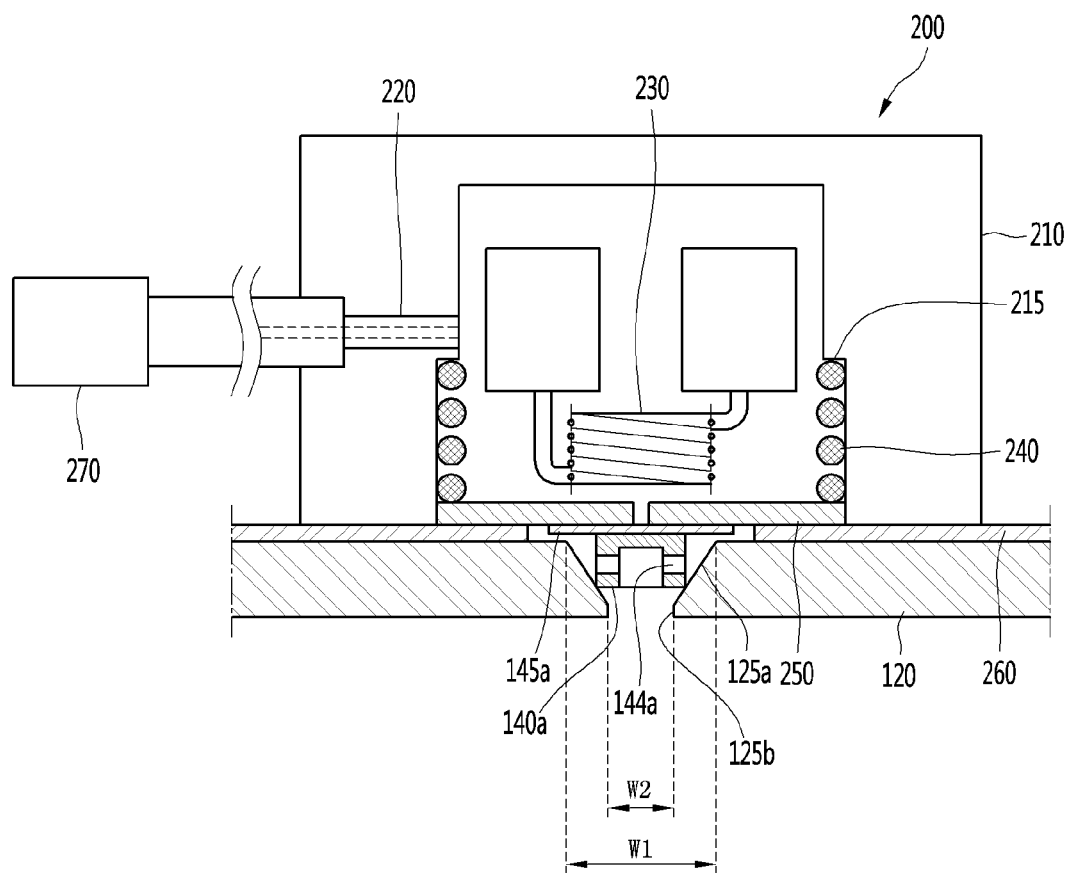
FIG. 3 is a view illustrating the configuration of an exhaust finishing device according to a first embodiment of the present disclosure.
Figure 4:
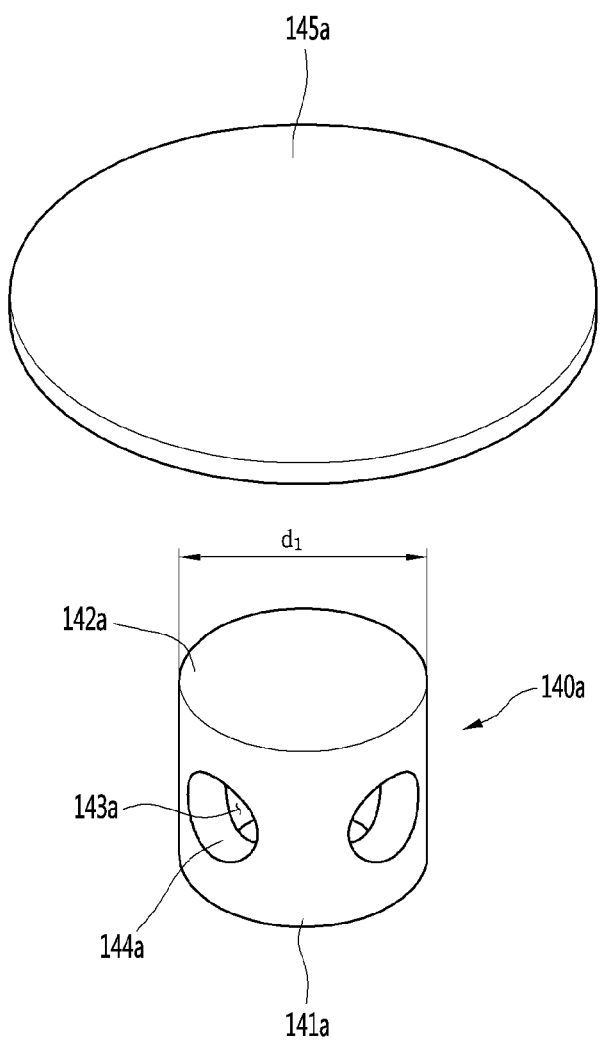
FIG. 4 is a view illustrating the configuration of an exhaust finishing frit and a cap frit according to the first embodiment of the present disclosure.
Figure 5:
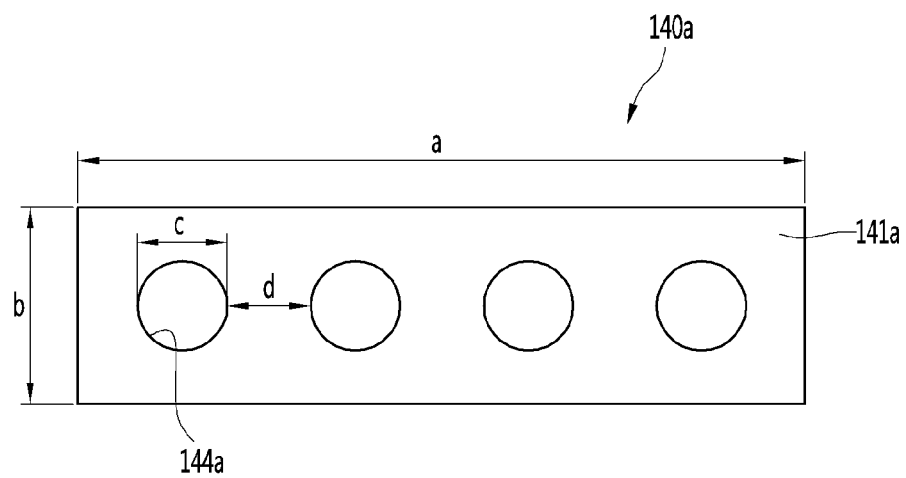
FIG. 5 is development view illustrating the configuration of a plurality of exhaust guide part formed in an outer circumferential surface of an exhaust finishing frit according to a first embodiment of the present disclosure.
Figure 6:
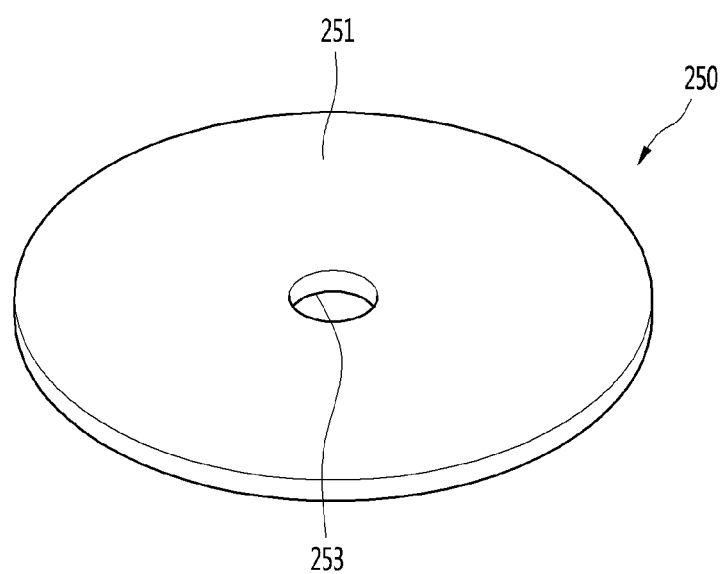
FIG. 6 is a view illustrating the configuration of a support plate according to a first embodiment of the present disclosure.

FIG. 3 is a view illustrating the configuration of an exhaust finishing device according to a first embodiment of the present disclosure. FIG. 4 is a view illustrating the configuration of an exhaust finishing frit and a cap frit according to the first embodiment of the present disclosure. FIG. 5 is development view illustrating the configuration of a plurality of exhaust guide part formed in an outer circumferential surface of an exhaust finishing frit according to a first embodiment of the present disclosure. FIG. 6 is a view illustrating the configuration of a support plate according to a first embodiment of the present disclosure.

Referring to FIGS. 3 to 6, the plate glass assembly (110 and 120) assembled in the method described with reference to FIGS. 2A to 2C may be provided in an exhaust finishing device 200 to perform the exhaust process and the finish process.

The exhaust finishing device 200 includes an exhaust head 210 coupled to an exhaust pipe 220. A heating device 230 is provided in an inner space of the exhaust head 210 to heat and melt the exhaust finishing frit 140a. For example, the heating device 230 may include a heater. The inner space of the exhaust head 210 forms a flowing space for the exhaust gas when performing the exhaust process.

The plate glass assembly (110 and 120) is disposed under the exhaust head 210. In this case, the second plate glass 120 may be coupled to the lower portion of the exhaust head 210 such that the exhaust hole 125 is directed toward the lower portion of the exhaust head 210.

A vacuum pad 260 may be provided on the plate glass assembly (110 and 120) such that the plate glass assembly (110 and 120) makes close contact with the exhaust finishing device 200. For example, the vacuum pad 260 may be attached to the top surface of the plate glass assembly (110 and 120), that is, the second plate glass 120 and may make contact with the bottom surface of the exhaust head 210.

The vacuum pad 260 is interposed between the plate glass assembly (110 and 120) and the exhaust finishing device 200 to prevent gas from leaking out of the exhaust head 210 when the exhaust process is performed. For example, the vacuum pad 260 may include a graphite sheet or a metal member.

An exhaust finishing frit 140a is disposed at or inserted into the exhaust hole 125 of the plate glass assembly (110 and 120). For example, at least a portion of the exhaust finishing frit 140a may be inserted into the exhaust hole 125.

The exhaust hole 125 includes a first part 125a recessed to be inclined downward from the top surface of the second plate glass 120 and a second part 125b recessed downward from the first part 125a. The exhaust hole 125 may have a stepped hole through the configuration of the first and second parts 125a and 125b.

In addition, the exhaust finishing frit 140a may support the first part 125a.

The exhaust finishing frit 140a may include a glass frit including a glass material, and may include a mold having a predetermined shape. In detail, the exhaust finishing frit 140a includes a frit body 141a having a cylindrical shape. The frit body 141a may have a body top surface 142a on which the cap frit 145a is seated.

The frit body 141a includes a recess part 143a recessed upward from a bottom surface of the frit body 141a. The recess part 143a has a space for exhausting the internal gas of the plate glass assembly (110 and 120) when the exhaust process is performed.

The frit body 141a further includes an exhaust guide part or a passing-through part 144a formed through an outer circumferential surface of the frit body 141a to communicate with the recess part 143a. The exhaust guide part 144a, which has a cylindrical shape, is formed in a radial direction of the frit body 141a.

The gas exhausted through the recess part 143a, that is, exhaust gas flowing through an inner part of the frit body 141a may be exhausted in the radial direction of the exhaust finishing frit 140a through the exhaust guide part 144a.

A plurality of exhaust guide parts 144a are formed in a circumferential direction in the outer circumferential surface of the frit body 141a. In detail, FIG. 5 illustrates the plurality of exhaust guide parts 144a formed in the frit body 141a, when the outer circumferential surface of the frit body 141a is developed.

Preferably, the sectional area of the exhaust guide part 144a is not excessively large. When the sectional area of the exhaust guide part 144a is excessively large, that is, the passing-through part of the exhaust guide part 144a is excessively large, the exhaust finishing frit 140a is provided in smaller amount, so the sealing effect of the exhaust hole 125 is reduced. For example, preferably, the sum of the sectional areas of the exhaust guide parts 144a is 50% or less of the sectional area of the outer circumferential surface of the frit body 141a.

On the assumption that the length of the outer circumferential surface of the frit body 141a, that is, a horizontal length of the development view is a first width 'a', a vertical height of the frit body 141a is a second width 'b', and the diameter of the exhaust guide part 144a is a third width 'c', and the distance between two exhaust guide parts 144a closest to each other in the exhaust guide parts 144a is a fourth width 'd', the third width 'c' and the fourth width 'd' should be formed to be 1 mm or more.

When the third width 'c' is less than 1 mm, the exhaust performance through the exhaust guide part 144a may be reduced. In addition, when the fourth width 'd' is less than 1 mm, the shape of the exhaust finishing frit 140a may not be maintained. Accordingly, the production of the exhaust finishing frit 140a is not easy, and the exhaust finishing frit 140a may be broken in the exhaust process.

The maximum size of the third width 'c' may be b-2 mm. Further, the maximum allowable number of the exhaust guide parts 144a may be determined as (a/(c+1))−1.

The first width 'a' may be determined based on the diameter 'd1' of the frit body 141a. The diameter d1 of the frit body 141a may be determined to be a size that may be stably supported to the exhaust hole 125.

The exhaust finishing frit 140a may be inserted into an upper end of the exhaust hole 125 to move downward such that the exhaust finishing frit 140a is supported to the first part 125a. On the assumption that an upper end width of the exhaust hole 125 is an upper end width 'w1', and a lower end width of the exhaust hole 125 is a lower end width 'w2', the upper end width 'w1' may be formed to be larger than the lower end width 'w2'. Alternatively, the upper end width 'w1' may be understood as the upper end width of the first part 125a, and the lower end width 'w2' may be understood as the width of the second part 125b.

The diameter 'd1' of the frit body 141a may be less than the upper end width 'w1' and may be greater than the lower end width 'w2'. When the diameter 'd1' of the frit body 141a may be greater than the upper end width 'w1', the exhaust finishing frit 140a may not be easily inserted into the exhaust hole 125. When the diameter 'd1' of the frit body 141a may be less than the lower end width 'w2', the exhaust finishing frit 140a may deviate from the exhaust hole 125. Accordingly, the present embodiment may prevent the problems.

The cap frit 145a is provided on the exhaust finishing frit 140a. The cap frit 145a may be interposed between the exhaust finishing frit 140a and the support plate 250.

The cap frit 145a may be provided in the form of a thin circular plate. In addition, the cap frit 145a may include a glass frit, and may have a melting point higher than that of the exhaust finishing frit 140a.

The bottom surface of the cap frit 145a is placed to makes contact with the body top surface 142a of the frit body 141a to press the frit body 141a. When the exhaust process is performed, the exhaust pressure is transferred to the frit body 141a through the cap frit 145a. In this process, the cap frit 145a strongly presses the frit body 141a including the glass frit.

According to such an action, when the following finish process is performed, air bubbles may be prevented from being generated in the process of melting the frit body 141a. Preferably, the air bubbles are prevented from being generated to block the cause of the leak of the vacuum layer 180 after the vacuum glazing glass 10 is completely manufactured.

The exhaust finishing device 200 further includes the support plate 250 provided at the lower portion of the exhaust head 210 to press the cap frit 145a. In other words, the support plate 250 may be disposed to make contact with the top surface of the cap frit 145a. In the process of performing the exhaust process, the support plate 250 presses down the cap frit 145a to guide the cap frit 145a to press the exhaust finishing frit 140a.

The support plate 250 prevents the thermal impact from being applied to the plate glass assembly (110 and 120) due to the temperature difference when the exhaust process and the finish process are performed. To this end, the support plate 250 may include metal material, for example, a stainless material. In addition, the support plate 250 may be interposed between the heating device 230 and the exhaust hole 125 of the plate glass assembly (110 and 120). The support plate 250 may be referred to as "heat radiation plate".

In detail, the exhaust process may be performed under the temperature environment of about 300° C. and the finish process may be performed under the temperature environment of about 400° C. In addition, the melting point of the exhaust finishing frit 140a may be greater than 300° C. and may be smaller than 400° C.

When the exhaust process and the finish process are performed, and when the temperature environment of each process is applied to the plate glass assembly (110 and 120) without change, the thermal impact is applied to the plate glass assembly (110 and 120) due to the temperature difference, thereby causing the damage to the plate glass assembly (110 and 120). Accordingly, the support plate 250 may be configured to cover upper portions of the exhaust finishing frit 140a and the cap frit 145a, the high-temperature heat is blocked by the support plate 250 to minimize the heat transfer to the plate glass assembly (110 and 120).

In addition, since the support plate 250 prevents heat transfer between the inner space of the exhaust head 210 and the plate glass assembly (110 and 120), the thermal impact is applied to the plate glass assembly (110 and 120) due to the temperature difference in the exhaust process and the finish process, thereby preventing the plate glass assembly (110 and 120) from being broken.

The support plate 250 includes a plate body 251 in a disc shape and a plate through part 253 formed through the plate body 251 to provide the flowing passage of the exhaust gas when the exhaust process is performed. The plate body 251 presses the cap frit 145a and may performs a function of preventing heat transfer from the exhaust head 210 to the plate glass assembly (110 and 120).

The plate through part 253 may be formed at the substantially central portion of the plate body 251. The plate through part 253 may communicate with the exhaust passes 143a and 147a of the exhaust finishing frit 140a.

In addition, the exhaust finishing device 200 further include an elastic member 240 provided in the inner space of the exhaust head 210 to apply elastic force to the support plate 250. For example, the elastic member 240 may include a coil compression spring.

The exhaust head 210 includes a spring support part 215 to support the elastic member 240. The spring support part 215 includes a support step provided on an inner surface of the exhaust head 210. The support step supports one portion of the elastic member 240. In addition, an opposite portion of the elastic member 240 may be supported on the top surface of the support plate 250. Since the elastic member 240 may press the support plate 250 down through the arrangement, the support plate 250 may press the cap frit 145a such that the position of the cap frit 145a may be stably fixed.

The elastic member 240 may be seated on an edge of the top surface of the support plate 250. For example, the diameter of the elastic member 240 may be formed to be equal to the diameter of the support plate 250. In addition, the heating device 230 may be provided in the elastic member 240 and may be spaced apart upward from the top surface of the support plate 250 by a specified distance.

The exhaust pipe 220 is disposed to be coupled to the exhaust head 210 while passing through the exhaust head 210, and an exhaust ump 270 may be operatively connected with an outer portion of the exhaust pipe 220. The exhaust pipe 220 may be coupled to the exhaust head 210 while passing through the side portion of the exhaust head 210.

Figure 7:
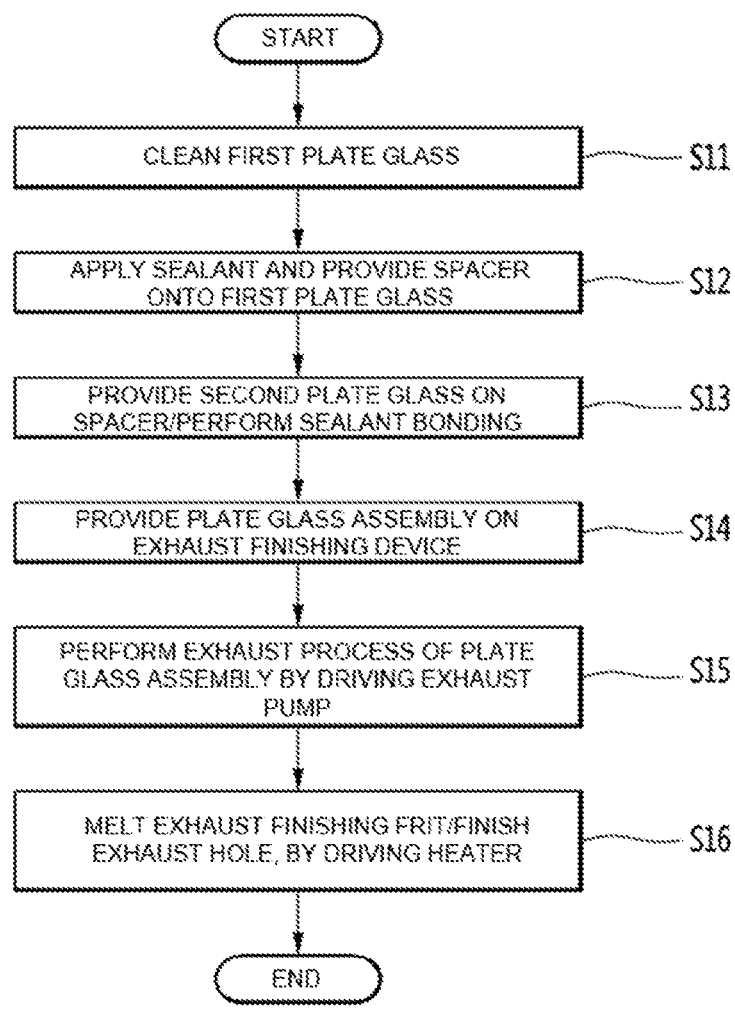
FIG. 7 is a flowchart illustrating a method for manufacturing vacuum glazing, according to a first embodiment of the present disclosure.
Figure 8:
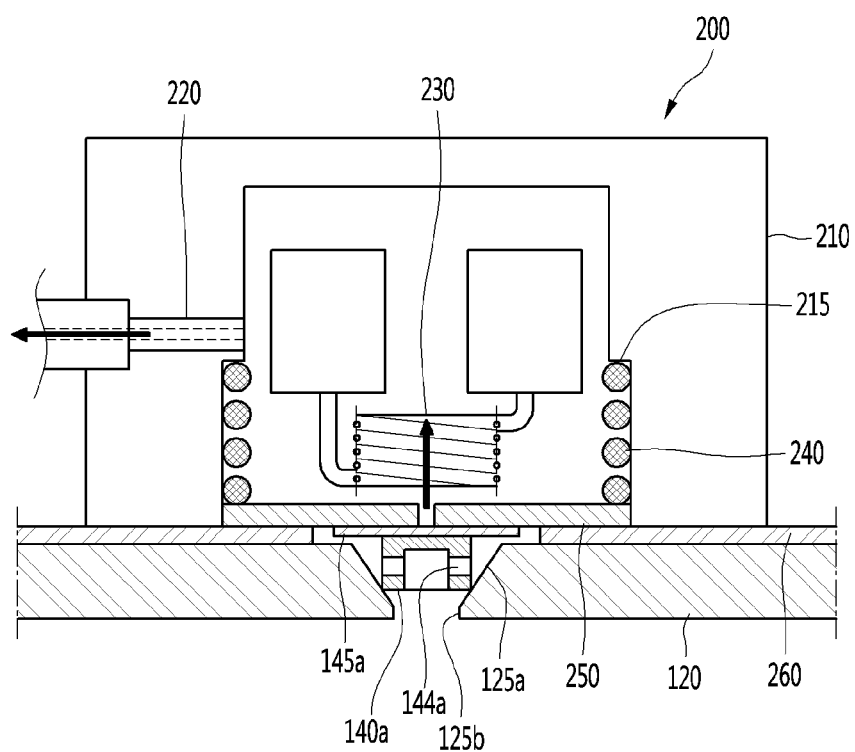
FIG. 8 is a view that an exhaust process is performed, in an exhaust finishing frit, according to the a embodiment of the present disclosure.

FIG. 7 is a flowchart illustrating a method for manufacturing vacuum glazing, according to the first embodiment of the present disclosure, and FIG. 8 is a view that an exhaust process is performed, in an exhaust finishing device, according to the first embodiment of the present disclosure.

Referring to FIG. 7, the first plate glass 110 is provided. The first plate glass 110 may be provided while being cleaned (S11).

The sealant 170 is applied to the first plate glass 110. The sealant 170 may be applied along an edge of the first plate glass 110. The spacer 130 may be provided on the top surface of the first plate glass 110. A plurality of spacers 130 may be provided at preset distances. The plurality of spacers 130 may protrude from the top surface of the first plate glass 110 (S12).

The second plate glass 120 may be covered on the first plate glass 110. When the second plate glass 120 is provided, the upper portions of the plurality of spacers 130 may support the bottom surface of the second plate glass 120.

The exhaust hole 125 may be formed in the second plate glass 120. As described above, the exhaust hole 125 is understood as a component to exhaust gas present between the first and second plate glasses 110 and 120 to form the vacuum layer 180. In addition, the gas adsorbent 160 may be provided on the bottom surface of the second plate glass 120.

When the first and second plate glasses 110 and 120 are assembled in the method, the assembly (hereinafter, a plate glass assembly) of the first and second plate glasses 110 and 120 is heated. In this heating procedure, the sealant 170 is melted and compressed to seal the edge of the first and second plate glasses 110 and 120 (S13).

The plate glass assembly (110 and 120) is provided in the exhaust finishing device 200. In detail, the vacuum pad 260 may be coupled to the top surface of the plate glass assembly (110 and 120), and the bottom surface of the exhaust head 210 may make close contact with the top surface of the vacuum pad 260.

The support plate 250 is provided at the lower portion of the exhaust head 210 and the elastic member 240 is coupled to the upper portion of the support plate 250. The exhaust finishing frit 140a is positioned at the exhaust hole 125 of the plate glass assembly (110 and 120), and the cap frit 145a is seated on the exhaust finishing frit 140a. In addition, the support plate 250 may be disposed to press the top surface of the cap frit 145a (S14).

The exhaust pump 270 is connected to the exhaust pipe 220 coupled to the exhaust head 210. The temperature of the inner space of the exhaust head 210 may be increased to the temperature (about 300° C.) for performing the exhaust process. For example, the increase in the temperature may be performed through the operation of the heating device 230 or another heating device (heating furnace).

Gas present inside the plate glass assembly (110 and 120) is exhausted by driving the exhaust pump 270, that is, the exhaust process is performed.

In detail, referring to FIG. 7, when the exhaust process is performed, the internal gas of the plate glass assembly (110 and 120) flows through the recess part 143a and the exhaust guide part 144a of the exhaust finishing frit 140a and flows into the inner space of the exhaust head 210 through the plate through part 253 of the support plate 250. In addition, the exhausted gas may be exhausted to the exhaust pump 270 through the exhaust pipe 220 (S15).

After the exhaust process is completed, the exhaust finishing frit 140a is melted by driving the heating device 230. When the heating device 230 is driven, the exhaust finishing frit 140a may be applied with heat at the temperature of about 400° C. higher than the melting point of the exhaust finishing frit 140a. In addition, since the melting point of the cap frit 145a is formed to be greater than 400° C., the cap frit 145a may not be melted.

When the exhaust finishing frit 140a is melted, the melted exhaust finishing frit 140a constitutes the exhaust finishing material 140 to block the exhaust hole 125 and to seal the exhaust hole 125 after cooling. In this process, the cap frit 145a may constitute the finishing cap 145 to cover the upper portion of the exhaust finishing frit 140a such that the cap frit 145a may close contact with the plate glass assembly (110 and 120). A sealant may be applied to the cap frit 145a to combine the cap frit 145a with the plate glass assembly (110 and 120).

For another example, after melting and cooling processes, an additional cover may be coupled to the upper portion of the cap frit 145a, and the coupled cover member may constitute the finishing cap 145 (S16).

According to such a manufacturing method, the exhaust process and the finish process of the plate glass assembly (110 and 120) may be realized with reality through a simple process.

Hereinafter, a second embodiment and a third embodiment of the present disclosure will be described. The above embodiments are different from the first embodiment in the configuration of the exhaust finishing device when comparing with the first embodiment. Accordingly, the following description will be made while focusing on the difference, and the description of the same part as that of the first embodiment will be understood by citing the description of the first embodiment, and will be assigned with reference numerals of the first embodiment.

Second Embodiment

Figure 9:
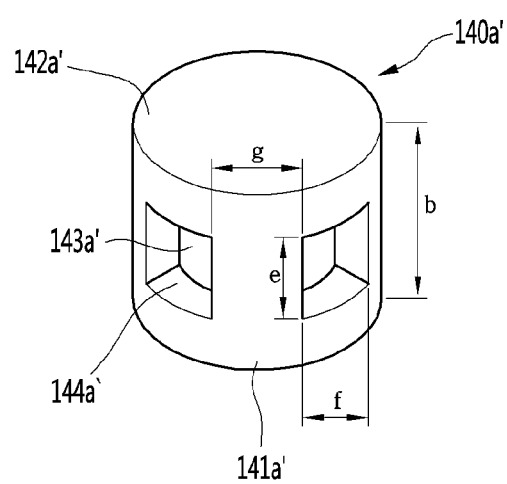
FIG. 9 is a view illustrating the configuration of an exhaust finishing frit, according to a second embodiment of the present disclosure.

FIG. 9 is a view illustrating the configuration of an exhaust finishing frit according to a second embodiment of the present disclosure.

Referring to FIG. 9, according to the second embodiment of the present disclosure, an exhaust finishing frit 140a' may be disposed in the exhaust hole 125 of the plate glass assembly (110 and 120).

In detail, the exhaust finishing frit 140a' includes a frit body 141a' having a cylindrical shape. The frit body 141a' may have a body top surface 142a' on which the cap frit 145a is seated.

The frit body 141a' includes a recess part 143a' recessed upward from a bottom surface of the frit body 141a. The recess part 143a' has a space for exhausting the internal gas of the plate glass assembly (110 and 120) when the exhaust process is performed. The description of the frit body 141a', the body top surface 142a', and the recess part 143a' will be understood by citing the description of the first embodiment.

The frit body 141a' further includes an exhaust guide part or a passing-through part 144a' formed through an outer circumferential surface of the frit body 141a' to communicate with the recess part 143a'. The exhaust guide part 144a may have a polygonal shape, for example, a quadrangular shape.

The gas exhausted through the recess part 143a', that is, exhaust gas flowing through an inner part of the frit body 141a' may be exhausted in the radial direction of the exhaust finishing frit 140a' through the exhaust guide part 144a'.

A plurality of exhaust guide part 144a' may be formed in an outer circumferential surface of the frit body 141a'. Preferably, the sectional area of the exhaust guide part 144a' is not excessively large. When the sectional area of the exhaust guide part 144a' is excessively large, that is, the passing-through part of the exhaust guide part 144a' is excessively large, the exhaust finishing frit 140a is provided in smaller amount, so the sealing effect of the exhaust hole 125 is reduced. For example, preferably, the sum of the sectional areas of the exhaust guide parts 144a' is 50% or less of the sectional area of the outer circumferential surface of the frit body 141a.

On the assumption that the vertical direction height of the frit body 141a' is the second width 'b', the vertical direction height of the exhaust guide part 144a' is a fifth width 'e', a horizontal length of the exhaust guide part 144a' is a sixth width 'f', and the distance between the two exhaust guide parts 144a' is a seventh width 'g', the fifth width 'e', the sixth width 'f', and the seventh width 'g' should be formed to have at least 1 mm or more.

When the fifth width 'e' and the sixth width 'f' is less than 1 mm, the exhaust performance through the exhaust guide part 144a' may be reduced. In addition, when the seventh width 'g' is less than 1 mm, the shape of the exhaust finishing frit 140a' may not be maintained. Accordingly, the production of the exhaust finishing frit 140a' is not easy, and the exhaust finishing frit 140a' may be broken in the exhaust process.

The maximum size of the fifth width 'e' may be b-2 mm. The maximum size of the sixth width 'f' may be (a-4)/4 mm. The description of the first width 'a' may be understood by citing the description of the first embodiment.

Third Embodiment

Figure 10:
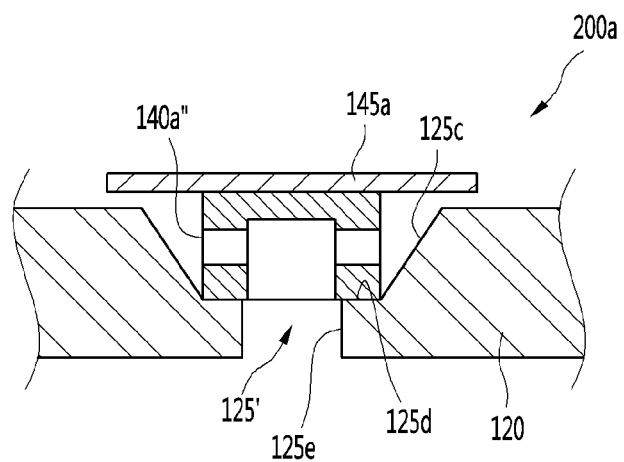
FIG. 10 is a sectional view illustrating that an exhaust finishing frit is mounted on a second plate glass, according to a third embodiment of the present disclosure.

FIG. 10 is a sectional view illustrating that an exhaust finishing frit is mounted on a second plate glass according to a third embodiment of the present disclosure.

Referring to FIG. 10, according to the third embodiment of the present disclosure, an exhaust finishing device 200a includes a second plate glass 120 having an exhaust hole 125'.

In detail, the exhaust hole 125' includes a first part 125c extending to be inclined downward from the top surface of the second plate glass 120, a second part 125d extending in a horizontal direction from the first part 125c and a third part 125e extending downward from the second part 125d. The exhaust hole 125' may have a stepped hole through the configuration of the first, second, and third parts 125c, 125d, and 125e.

An exhaust finishing frit 140a" may be disposed at the exhaust hole 125'. The description of the exhaust finishing frit 140a" will be understood by citing the description of the exhaust finishing frit 140a.

In addition, the exhaust finishing frit 140a" may be supported to the second part 125d. In other words, the exhaust finishing frit 140a" may be supported to the second part 125d extending in a flat form in the horizontal direction.

The exhaust process, and the melting and finishing process using the exhaust finishing frit 140a" will be understood by citing the description of FIG. 7.

INDUSTRIAL APPLICABILITY

According to the method for manufacturing the vacuum glazing of the embodiment of the present disclosure, the vacuum glazing having the improved insulating performance may be manufactured, so Industrial Applicability is remarkable.

The invention claimed is:

1. An apparatus for manufacturing vacuum glazing, the apparatus comprising:
an exhaust head disposed at a side of a plate glass assembly having an exhaust hole in which an exhaust finishing frit is disposed;
an exhaust pump connected to the exhaust head and configured to perform vacuum exhaust for the plate glass assembly;
an exhaust finishing frit inserted into the exhaust hole of the plate glass assembly;
a cap frit disposed at an upper side of the exhaust finishing frit,
wherein the exhaust finishing frit comprises:
a frit body having a body top surface on which the cap frit is disposed, the body top surface being pressed by the cap frit when an exhaust process is performed;
a recess part recessed in an upward direction from a bottom surface of the frit body to form a flowing space for exhaust gas; and
an exhaust guide part formed through an outer circumferential surface of the frit body to communicate with the recess part,
wherein the body top surface is configured to shield the recess part to allow the exhaust gas exhausted through the recess part to be exhausted in a radial direction of the exhaust finishing frit through the exhaust guide part, and
wherein the exhaust guide part is spaced apart from the bottom surface of the frit body and from the body top surface of the frit body, and the outer circumferential surface of the frit body comprises a portion disposed between the body top surface of the frit body and the exhaust guide part.

2. The apparatus of claim 1, wherein the recess part is communicably arranged with the exhaust guide part, and
wherein when the exhaust pump is driven, internal gas of the plate glass assembly is discharged to the exhaust pump through the recess part and the exhaust guide part.

3. The apparatus of claim 1, wherein the exhaust guide part has a circular shape.

4. The apparatus of claim 3, wherein the diameter of the exhaust guide part is at least 1 mm.

5. The apparatus of claim 3, wherein the exhaust guide part comprises a plurality of exhaust guide parts provided in a circumferential direction.

6. The apparatus of claim 5, wherein a distance between two exhaust guide parts, which are closest to each other, of the plurality of exhaust guide parts, is at least 1 mm.

7. The apparatus of claim 1, wherein the exhaust guide part has a rectangular shape.

8. The apparatus of claim 7, wherein a length of the exhaust guide part in a vertical direction and a length of the exhaust guide part in a horizontal direction are each at least 1 mm.

9. The apparatus of claim 1, wherein the plate glass assembly comprises:
a first plate glass and a second plate glass, the second plate glass disposed to be spaced apart in an upward direction from the first plate glass, and
wherein the exhaust hole is formed to pass through a top surface of the second plate glass to a bottom surface of the second plate glass.

10. The apparatus of claim 9, wherein the exhaust hole has a stepped shape.

11. The apparatus of claim 10, wherein the exhaust hole comprises:
a first part recessed to be inclined in a downward direction from the top surface of the second plate glass, and
a second part recessed in a downward direction from the first part,
whereby the exhaust finishing frit is supported by the first part.

12. The apparatus of claim 10, wherein the exhaust hole comprises:
a first part extending to be inclined in a downward direction from the top surface of the second plate glass,
a second part extending in a horizontal direction from the first part, and
a third part extending in a downward direction from the second part,
whereby the exhaust finishing frit is supported by the second part.

13. The apparatus of claim 1, wherein the exhaust head comprises:
an inner space having a flowing space for the exhaust gas to flow, and
a heater disposed in the inner space to provide a heat source for heating the exhaust finishing frit.

14. The apparatus of claim 1, further comprising:
a vacuum pad disposed between the plate glass assembly and the exhaust head, the vacuum pad configured to prevent the exhaust gas from leaking out of the exhaust head,
wherein the vacuum pad comprises a graphite sheet or a metallic member.

15. The apparatus of claim 1, further comprising a support plate provided at the exhaust head and disposed to make contact with the cap frit,
wherein the cap frit is disposed between the support plate and the body top surface of the frit body.

16. The apparatus of claim 15, wherein the support plate comprises a plate body having a disc shape and a plater through part formed through the plate body to provide an exhaust passage of the exhaust gas when the exhaust process is performed.

\* \* \* \* \*